US010808202B2

(12) United States Patent
Kellens et al.

(10) Patent No.: US 10,808,202 B2
(45) Date of Patent: Oct. 20, 2020

(54) IN LINE DEGUMMING AND NEUTRALIZATION OF OILS AND FATS USING HYDRODYNAMIC FLOW-THROUGH CAVITATION REACTORS

(71) Applicant: N.V. Desmet Ballestra Engineering S.A., Zaventem (BE)

(72) Inventors: Marc Kellens, Mechelen-Muizen (BE); Vincent Van Den Schrieck, Sint-Pieters-Leeuw (BE)

(73) Assignee: N.V. Desmet Ballestra Engineering S.A., Zaventem (BE)

( * ) Notice: Subject to any disclaimer, the term of this patent is extended or adjusted under 35 U.S.C. 154(b) by 0 days.

(21) Appl. No.: 16/693,658

(22) Filed: Nov. 25, 2019

(65) Prior Publication Data

US 2020/0239809 A1 Jul. 30, 2020

Related U.S. Application Data

(60) Provisional application No. 62/796,844, filed on Jan. 25, 2019.

(51) Int. Cl.
*C11B 3/06* (2006.01)
*B01J 19/08* (2006.01)
*B01J 19/00* (2006.01)

(52) U.S. Cl.
CPC ............... *C11B 3/06* (2013.01); *B01J 19/008* (2013.01); *B01J 2219/0004* (2013.01); *B01J 2219/00038* (2013.01)

(58) Field of Classification Search
CPC ................................ C11B 3/06; B01J 19/008
USPC ........................................................... 554/83
See application file for complete search history.

(56) References Cited

U.S. PATENT DOCUMENTS 9,340,749 B1 * 5/2016 Kozyuk .................... C11B 3/04
9,481,853 B2 * 11/2016 Gordon ................. B01F 5/0644

* cited by examiner

*Primary Examiner* — Yong L Chu
(74) *Attorney, Agent, or Firm* — Wegman Hessler

(57) ABSTRACT

A process for the combined degumming and neutralization of an oil containing phosphatides and FFA, the process comprising: dosing an aqueous degumming reactant into the oil to form a mixture; introducing the mixture into a first set of flow-through hydrodynamic cavitation reactors to form at the exit of the first set of flow-through hydrodynamic cavitation reactors a mixture; dosing, at the exit of the first set of flow-through hydrodynamic cavitation reactors an aqueous caustic solution into the oil to form a mixture of aqueous caustic dispersed into the oil; introducing the mixture of an aqueous caustic dispersed into the oil into a second set of flow-through hydrodynamic cavitation reactors to form a mixture of oil containing hydrated phosphatides and neutralized FFA (soaps); and separating the mixture of oil containing hydrated phosphatides and soaps to obtain an oil phase and an aqueous phase.

14 Claims, 4 Drawing Sheets

Degumming cavitation reactor(s)

Neutralization cavitation reactors

IN LINE DEGUMMING AND NEUTRALIZATION OF OILS AND FATS USING HYDRODYNAMIC FLOW-THROUGH CAVITATION REACTORS

CROSS-REFERENCE TO RELATED APPLICATION

This application claims priority to U.S. Provisional Patent Application No. 62/796,844 filed Jan. 25, 2019, the entirety of which is incorporated herein by reference.

FIELD OF THE INVENTION

The invention relates to the in-line, cavitation assisted, combined degumming and neutralization of oils or fats making use of at least two specific hydrodynamic flow-through cavitation reactors connected in series.

BACKGROUND OF THE INVENTION

The invention takes advantage of the energy released upon implosion of the bubbles created by the cavitation events to enhance the reactivity of the degumming and neutralization reactants mixed with the oils or fats. More particularly, the present invention relates to the degumming of oils or fats by utilizing cavitation events to both modify phosphatides, i.e. hydratable phosphatides (HP) and non-hydratable phosphatides (NHP), and to neutralize the free fatty acids (FFA) contained into said oils or fats. The invention also permits the one-step efficient separation of the modified phosphatides (gums) and neutralized free fatty acids (soaps), which both segregate in a distinct aqueous phase, to obtain a degummed and neutralized oil or fat.

The preferred oils that can be degummed and neutralized using the present invention are for example vegetable oils, i.e., oils extracted from soybean, sunflower, canola, corn, cottonseed, grape seed, ground nut, palm fruits or linseed. Fats from animal origin can also benefit from the present invention. In general, those oils or fats, that from now on will be designed collectively as oils (or oil depending upon the context), can be crude i.e. as directly resulting from mechanical or solvent extraction process, or can already have been subjected to at least one basic purification step such as a filtration and/or a water washing and/or a water degumming. Despites those one or more basic purification step(s), those oils often still contain excessive level of phosphatides, in particular non-hydratable phosphatides (NHP) as well as excessive amount of free fatty acids (FFA) that are advantageously removed by the process according to the present invention.

Thus, crude or partially purified oils contain several impurities, such as phosphatides, free fatty acids (FFA), off-flavor compounds, chlorophyll and other pigments, metal traces, waxes and optionally other various impurities. Those impurities negatively affect taste, smell, appearance, and shelf-life of oils and have to be removed before consumption or before downstream treatments such as bleaching, deodorizing or modifications including for example fractionation, interesterification or hydrogenation. Phosphatides will degrade at the elevated temperatures used during the deodorization with the risk to irremediably darken its host oil. To suppress this risk, and to be deodorized safely, oil phosphatides concentration should be below 5 ppm and even preferably below 2 ppm. Oil bleaching also requires low concentration of residual concentration in order to be performed efficiently, typically oil phosphatide concentration should be below 20 ppm and even preferably below 10 ppm prior bleaching.

Many degumming methods have been developed, including water degumming (treatment of crude oil with hot water or steam); acid degumming (treatment of crude oil with an aqueous solution of strong acid such as phosphoric acid or citric acid); dry degumming (acid degumming with very small amount of water, combined with bleaching); enzymatic degumming (modification of phospholipids with enzymes to obtain the water-soluble compounds); degumming with chelating agents (such as EDTA for example). Some of those methods are more adapted to one type of oil. For example, dry degumming will be more efficient for palm oil because it contains naturally a low concentration of phosphatides. Oils containing naturally a higher concentration of phosphatides, in particular, non-hydratable phosphatides (NHP) such as for example soybean oil, sunflower oil and canola oil (also known as rapeseed oil) typically need the contact with an aqueous solution of strong acid to be appropriately degummed and will particularly benefit from the process according to the present invention.

FFA removal can be performed by the chemical neutralization by contacting the oil with an aqueous caustic solution reacting with said FFA to form soaps that are removed as a separate aqueous phase, most often with the use of a centrifugal separator. FFA can also be removed by the physical refining, also known as dry or steam refining. Physical refining is based on the higher volatility of FFA compared to triglycerides and is in practice realized concomitantly with the deodorization.

The classical steps needed to obtain a fully refined oil i.e. the degumming, alkaline neutralization, bleaching, dewaxing and deodorizing are well known in the art, and therefore will not be further reviewed, but it should be understood that each individual purification step results in some oil loss as well as chemical and/or energy consumption and generation of one or more waste stream(s). It is the purpose of this invention to minimize as much as possible any oil loss, energy and chemical consumption and waste stream generation during the in-line combined degumming and neutralization of oils using hydrodynamic flow-through cavitation reactors.

The process disclosed according to the present invention is suited both for oils that have been previously water degummed or not. As a matter of fact, the need of such preliminary water degumming, using conventional methods, will mostly depends on the type of oil source. For example, soybean oil is often water degummed just after its extraction, especially when lecithin is wanted, but other oils such as for example sunflower or rapeseed oils are not systematically water degummed. However, the process according to the present invention is advantageous on oils that contain mainly non-hydratable phosphatides and therefore, it mostly corresponds to oils that have been previously water degummed. Another advantage of preliminary water degumming is that it yields intact gums, or lecithin, having a non-negligible value. In the process according to our invention, the degumming and neutralization, since combined, leads to gums mixed with the soaps and furthermore containing the degumming and neutralizing reactants. Therefore, those contaminated gums cannot be used as lecithin.

Even if numerous oil degumming methods have been disclosed, only a few degumming methods involving cavitation has been proposed so far. Cavitation can be of different origins, including hydrodynamic cavitation and ultrasonic cavitation.

It has been reported that crude soybean oil can be degummed by applying ultrasound sonication in the presence of a small amount of degumming agent (Moulton and Mounts, 1999). This procedure, when put in place in a small-scale laboratory equipment, removes up to 99% of the phospholipids. However, it should be noted that the ultrasound technology is only applicable as a batch process and since the ultrasound effect diminishes with the increase of the distance from the radiation source, the treatment efficiency of sonic cavitation depends on a container's size and is thus very low with larger vessels. The ultrasound effects occur at particular locations, depending on the radiation frequency and, therefore, are not uniform. Moreover, sonic cavitation cannot be used efficiently in continuous processes with a high throughput. In sonic cavitation, the energy requirement is too high, and the residence time is too long to be economically feasible for high throughput degumming.

U.S. Pat. No. 9,481,853B2 to Gordon et al. discloses a flow-through hydrodynamic method for cavitation-assisted refining, degumming and dewaxing of oils and fats, which distinct from sonic cavitation, does not require using a vessel. The method involves mixing the crude oil with degumming agents, i.e. water or acid, and subjecting the mixture to flow-through, hydrodynamic cavitation processing. The cavitational processing transfers impurities from the crude oil to a water phase for easier separation. The water phase may be separated from the oil phase by commonly available separation methods. However, this process is silent about the neutralization i.e. the removal of FFA from the treated oil.

However, a recent publication (WO 2016/178676 A1 to Kozyuk et al.) indicates that cavitation should in fact be avoided in order to not jeopardize the phases separation (i.e. the separation and removal of water phase containing the gums and other impurities from the oil). Since an efficient phase separation is paramount to an effective oil degumming and/or neutralization, one can conclude that cavitational processes should be avoided. In WO 2016/178676 A1, a method for degumming triglyceride oils using a multi-stage homogenization method is disclosed. Two high-pressure homogenizers are used in series. The homogenizers have multiple flow constrictions to finely disperse reagents in the oil while simultaneously suppressing cavitation in the fluid. A separation step can be used to remove the phosphatides and other impurities from the treated oil to form a purified oil product. According to WO 2016/178676 A1, cavitation induces the release of dissolved gases in the oil mixture and generate post cavitation gas fields of tiny bubbles in the fluid flow. Those bubbles become coagulation centers for the soap particles, entrap oil in the larger agglomerates and can decrease phase boundary in the oil-acid/base solution. As a result, the rate of hydrolysis of phosphatides, and the degree of removal thereof, in the purification process will decrease as the fields of bubbles persist in the fluid. Entrapment of the oil in larger agglomerates can also increase oil yield losses. For those reasons, WO 2016/178676 A1 makes use of homogenization apparatuses where hydrodynamic cavitation does not occur.

Therefore, one can conclude that hydrodynamic cavitation is not a recommended technology for the combined degumming and neutralization of oil because the necessary phase separation following those two steps would be inefficient. This situation is damageable because hydrodynamic cavitation is well known to be an energy efficient process able to accelerate chemical reactions in fluids and allowing a reduced consumption of chemicals compared to standard processes. Furthermore, since no vessels are needed, the erection cost and the footprint of the installation could be dramatically reduced as well.

Therefore, there is a need in the art to design a process for the combined degumming and neutralization of oil making use of flow-through hydrodynamic cavitation reactors, followed by an efficient phase separation while reducing energy consumption, chemical consumptions, oil loss and the size of the installation. The prior art techniques do not offer the most efficient method of combined degumming and neutralization of oils, in the shortest amount of time possible.

The present invention provides such methods, with shorter processing time, less oil loss and less consumption of chemicals and consequently less production of waste harmful to environment while producing improved product. The footprint of the process according to the present invention is also reduced compared to prior art methods.

Therefore, with the goal to maximize profit margin, it is necessary to decrease processing time, energy and chemicals consumption, oil loss and to reduce as much as possible waste production during degumming and neutralization. The prior art methods do not offer the most efficient method in the shortest time possible. Therefore, a need exists for the improved method for the oil degumming and neutralization with a minimal residence time and energy cost that produces degummed oils with low levels of residual phospholipids and FFA. The present invention satisfies these needs and provides other related advantages.

SUMMARY OF THE INVENTION

It has surprisingly been observed that the previously listed goals can be achieved with a continuous process for the combined degumming and neutralization of oil containing phosphatides and FFA, said process comprising the steps of:

a) dosing an aqueous degumming reactant into said oil containing phosphatides and FFA to form a mixture of aqueous degumming reactant dispersed into said oil containing phosphatides and FFA, b) introducing said mixture of aqueous degumming reactant dispersed in oil containing phosphatides and FFA into a first set of flow-through hydrodynamic cavitation reactor(s), to form at the exit of said first set of flow-through hydrodynamic cavitation reactor(s) a mixture of oil containing hydrated phosphatides and FFA, c) dosing, at the exit of said first set of flow-through hydrodynamic cavitation reactor(s) an aqueous caustic solution into said oil containing hydrated phosphatides and FFA to form a mixture of aqueous caustic dispersed into said oil containing hydrated phosphatides and FFA, d) introducing said mixture of an aqueous caustic dispersed into said oil containing hydrated phosphatides and FFA into a second set of flow-through hydrodynamic cavitation reactor(s), to form at the exit of said second set of flow-through hydrodynamic cavitation reactor(s) a mixture of oil containing hydrated phosphatides and neutralized FFA (soaps), f) separating the mixture of oil containing hydrated phosphatides and soaps to obtain an oil phase and an aqueous phase i.e. a degummed and neutralized oil and hydrated phosphatides (gums) and neutralized FFA (soaps) dispersed and/or solubilized in water, characterized in that each flow-through hydrodynamic cavitation reactor(s) of the first set and of the second set comprises at least one cavitation chamber having a cavitation number Cv lower than 1.

It has surprisingly been observed that the previously listed goals can be further achieved with a continuous process for the combined degumming and neutralization of oil containing phosphatides and FFA as previously described wherein said oil containing phosphatides and FFA is forced through the first and second sets of flow-through hydrodynamic cavitation reactor(s) by the action of one high pressure pump positioned before the first set of flow-through hydrodynamic cavitation reactor(s).

It has surprisingly been observed that the previously listed goals can be further achieved with a continuous process for the combined degumming and neutralization of oil containing phosphatides and FFA as previously described wherein said oil containing phospholipids and FFA is forced through the first and second set of flow-through hydrodynamic cavitation reactor(s) by the action of two high pressure pumps, the first one being positioned before said first set flow-through hydrodynamic cavitation reactor(s) and the second high pressure pump being placed between the first and second set of flow-through hydrodynamic cavitation reactor(s).

It has surprisingly been observed that the previously listed goals can be further achieved with a continuous process for the combined degumming and neutralization of oil containing phosphatides and FFA as previously described wherein wherein said phase separation step e) is performed by a centrifugal separator.

It has surprisingly been observed that the previously listed goals can be further achieved with a continuous process for the combined degumming and neutralization of oil containing phosphatides and FFA as previously described wherein 0.5 to 2.0% of water is added to the degummed and neutralized oil prior to be treated by a centrifugal separator.

It has surprisingly been observed that the previously listed goals can be further achieved with a continuous process for the combined degumming and neutralization of oil containing phosphatides and FFA as previously described wherein the degummed and neutralized oil is heated at a temperature comprised between 70 and 95° C.

It has surprisingly been observed that the previously listed goals can be further achieved with a continuous process for the combined degumming and neutralization of oil containing phosphatides and FFA as previously described wherein the degumming agent is an aqueous solution of an acid such as citric acid or phosphoric acid.

It has surprisingly been observed that the previously listed goals can be further achieved with a continuous process for the combined degumming and neutralization of oil containing phosphatides and FFA as previously described wherein the degumming agent is enzyme such as but not limited to lipase, phospholipase or acyltransferase or any blends thereof.

It has surprisingly been observed that the previously listed goals can be further achieved with a continuous process for the combined degumming and neutralization of oil containing phosphatides and FFA as previously described wherein the aqueous caustic solution of an aqueous solution of an alkali such as sodium hydroxide or potassium hydroxide.

It has surprisingly been observed that the previously listed goals can be further achieved with a continuous process for the combined degumming and neutralization of oil containing phosphatides and FFA as previously described wherein said aqueous degumming reactant of step a) and/or said aqueous caustic of step d) is introduced by a high-pressure dosing device.

It has surprisingly been observed that the previously listed goals can be further achieved with a continuous process for the combined degumming and neutralization of oil containing phosphatides and FFA as previously described wherein the oil containing phosphatides and FFA is further heated in the range of 20 to 70° C. prior to step a).

It has surprisingly been observed that the previously listed goals can be further achieved with a continuous process for the combined degumming and neutralization of oil containing phosphatides and FFA as previously described wherein the first and/or the second set of flow-through hydrodynamic cavitation reactor(s) contain at least one flow-through hydrodynamic cavitation reactor(s).

It has surprisingly been observed that the previously listed goals can be further achieved with a continuous process for the combined degumming and neutralization of oil containing phosphatides and FFA as previously described wherein the first and/or the second set of flow-through hydrodynamic cavitation reactor(s) contain at least two flow-through hydrodynamic cavitation reactors.

It has surprisingly been observed that the previously listed goals can be further achieved with a continuous process for the combined degumming and neutralization of oil containing phosphatides and FFA as previously described wherein the first and/or the second set of flow-through hydrodynamic cavitation reactor(s) contain at least two flow-through hydrodynamic cavitation reactors and said at least two flow-through hydrodynamic cavitation reactors are serially or parallelly connected.

Thus, the present invention provides a method for generating cavitation events in a flow of oil mixed with the precise amounts of reactants provided continuously by dosing pumps, the cavitation events occurring in at least two flow-through hydrodynamic cavitation reactors. The method yields degummed and neutralized oil after a one step phase separation removing the products of the degumming (i.e. gums) and the neutralization (i.e. soaps) as an aqueous separate phase.

The present invention is directed to a method for processing fluidic oils in at least two flow-through hydrodynamic cavitation reactors sets mounted in series: at least a first cavitation reactor(s) set where the degumming is performed and at least a second cavitation reactor(s) set where the neutralization is performed. The present invention is also directed to a method for combined degumming and neutralization of oils containing phosphatides, FFA and optionally other impurities. The other impurities may include off-flavor compounds, sulfurous compounds, pigments, chlorophyll, waxes, metals, carbohydrates, liposaccharides, proteins, aldehydes, ketones, terpenes, sterols, carotenes or pesticides. Some of those impurities as well as other impurities not listed previously may be reduced as well by the process according to the present invention. By combined, it is mean that the process according to the present invention includes both the degumming and the neutralization of the oil. The two reactions do not occur at the same time but in sequence: the degumming is firstly performed since efficient degumming reactant often include acids, and the neutralization is performed secondly since said neutralization need the presence of an alkali or base that will also neutralize the excess of degumming reactant if any. Those two reactions are thus combined in the process according to our invention.

However, it has surprisingly been observed that the mixture exiting the last cavitation reactor can be efficiently separated by a centrifuge separator without the need to use a large maturation tank or a large holding tank despite the fact that cavitation occurs into two or more cavitation reactors. For this cavitation to occur, the cavitation number must be inferior to 1.

However, even if not strictly necessary, a small buffer tank is usually installed just downstream the last cavitation reactor(s) set to accommodate for output variation between the cavitation reactors and the centrifugal separator. This is particularly convenient when the separator must be maintained or cleaned. But this buffer tank has not the function of a real maturation tank prior to the phase separation.

It has been surprisingly found that hydrodynamic cavitation significantly facilitates degumming and neutralization of oils i.e. allowing the fast and efficient hydratation of phosphatides and neutralization of FFA, followed by the phase separation using conventional equipment such as a centrifuge separator. It is believed that such unexpected results is due to the presence of at least a plasmator and/or at least an atomizing cone, preferably mounted inside the last cavitation reactor(s) and even more preferably in the vicinity of the outlet of said last cavitation reactor(s), that could suppress the secondary micro bubbles field at the exit of the last cavitation reactor(s) and allow a rapid and efficient phase separation without the need to use a maturation tank between the last cavitation reactor(s) and the centrifugal separator. As will become more apparent in the remaining part of this description, since the cavitation reactors can be connected parallelly in a given set, it is possible that the process according to the present invention makes use of several last cavitation reactors connected to the phase separation device.

Thus, in this respect the phase separation is rapid because the oil does not need to be held for a long time in a large maturation tank which is advantageous both for a cost erection reduction and foot print reduction perspective but is also advantageous for a process perspective. Indeed, it leads to a quicker process easier to adjust because said adjustments are directly measurable in the final degummed and neutralized oil. On the opposite, if a large maturation tank is needed between the last cavitation reactor and the centrifugal separator, the process becomes much more difficult to control because not only a considerable time delay between any process adjustment and its repercussion on the final properties of the degummed and neutralized oil is introduced, but such large maturation tank has also a blurring effect due to the unavoidable mixing occurring into said maturation tank.

Thus, the present invention leads to a process to produce oil having low concentration of phosphatides, FFA and other impurities such as soaps and water that is easily and rapidly controllable. Such innovative in-line degumming and neutralization method is achieved by the processing of the oil, mixed with adequate reactants, through at least two sets cavitation reactor(s) connected in series which expedite the necessary reactions, said method being further completed by the final rapid separation of the gums and soaps and optionally other impurities from the oil by a single phase separation step. By connected in series it is meant that the first set of reactor(s) where the degumming occurs is serially connected to the second set of reactor(s) where the neutralization occurs. The neutralization starts after the degumming. However, the process according to the present invention, may include several degumming cavitation reactors and/or several neutralization cavitation reactors and the degumming cavitation reactors as well as the neutralization cavitation reactors inside their respective set can be serially or parallelly connected.

Accordingly, besides the objects and advantages of the expeditious oil degumming and neutralization per se, as described above, several additional objects and advantages of the present inventions are:

1) to reduce energy and chemicals consumption, oil loss and waste generation during oil degumming and neutralization;
2) to provide a continuous flow apparatus for degumming and neutralizing oil in a dramatically expedited and simplified manner with reduced erection costs and requiring a greatly reduced footprint compared to alternative methods;
3) to provide a method of degumming and neutralizing by subjecting the oil to at least a first cavitation event in presence of an degumming reactant (such as acids or enzymes) and secondly by subjecting the mixture resulting from the at least first cavitation event to at least a second cavitation event in presence of a caustic aqueous solution directly followed by a rapid and efficient phase separation, thus without the need of maturation tank, hence said method being easily controlled.

Thus, the objects of the present invention are achieved by feeding the oil and adequate aqueous solutions of reactants in at least two sets of flow-through hydrodynamic cavitation reactors mounted in series to carry out the necessary reactions and facilitate the transfer of the reaction products (gums and soaps) from oil into a distinct aqueous phase that can be easily and rapidly separated for example in a centrifugal separator. The phenomenon is called cavitation because cavities (or bubbles) form when the flow pressure has been reduced to the fluid's vapor pressure. The vapor bubbles expand and suddenly collapse upon reaching a region of higher pressure. The violent collapse causes, in localized areas, a sudden burst of pressure and temperature as well as intense shearing forces, resulting in thorough mixing and chemical reactions acceleration. It is not uncommon to observe an increase of the temperature of the oil mixture going through the cavitation device.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying figures illustrate the invention.

DETAILED DESCRIPTION OF THE INVENTION

The objects of the present invention are achieved by feeding fluidic oil and adequate aqueous solution of reactants in two set of flow-through hydrodynamic cavitation reactor(s) connected in series. Each set contains at least one flow-through hydrodynamic cavitation reactor. In the following description, the terms 'flow-through hydrodynamic cavitation reactor(s)" is often replaced by "cavitation reactor(s)" or "reactor(s)" in order to shorten said description.

The hydrodynamic cavitation events occurring in those reactors induce conditions that favor degumming and neutralization. Hydrodynamic cavitation results in the formation of vapor cavities in the oil/reactants mixture flow when accelerated with a pump. The phenomenon is called cavitation because when the flow pressure reduces to the water vapor pressure, cavities form. The cavities are made to collapse upon reaching a downstream high-pressure region. The collapse of those cavities produces sudden and localized increase in pressure and temperature, as well as intense shearing forces, resulting in accelerated chemical reactions. But this strong agitation of course favorizes also the formation of emulsion. Furthermore, the presence of phosphatides and soaps, well known emulsification agents, will emphasize such emulsification and stabilize it. This situation is particularly detrimental for an efficient phase separation. But it has been surprisingly observed, that a fast and efficient phase separation is made possible, probably by the presence of plasmator and/or atomizing cone in at least one of the cavitation reactor, preferably the last one(s). Indeed, if the neutralization cavitation reactors are parallelly connected, it is preferred that each of the neutralization cavitation reactors directly connected to the phase separation devices is equipped with a plasmator and/or an atomizing cone. The cavitation reactors are designed to promote an intense and evenly cavitation occurrence with minimal energy input. An individual cavitation reactor may contain a succession of several cavitation chambers configured in series so that the fluid going through the reactor is therefore subjected to a succession of several cavitation events i.e. bubbles formation followed by the collapse of said bubbles. Such cavitation reactor containing several cavitation chambers is called multi-stage cavitation reactor. If only one cavitation chamber is present, it is usually called single stage cavitation reactor. The process according to our invention may include both type of reactors but preferably includes multi-stage cavitation reactors.

Figure 1:
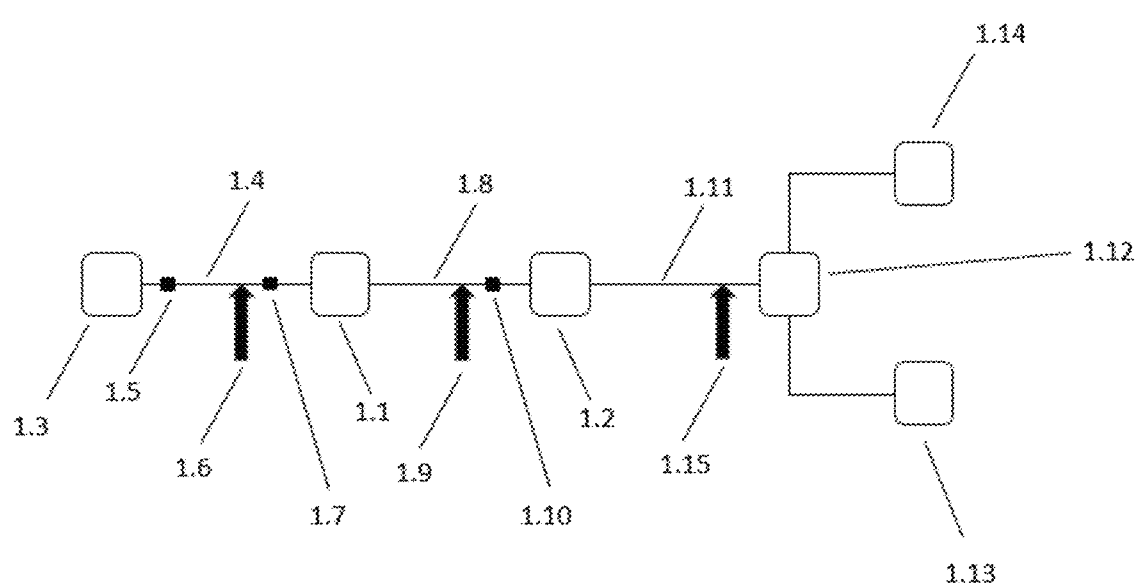
FIG. 1 illustrates how the first set of the one or more degumming cavitation reactor(s) is connected to the second set of the one or more neutralization cavitation reactor(s).

FIG. 1 illustrates notably how the two sets of cavitation reactor(s) are connected. The first set contains one or more degumming cavitation reactor(s) and is serially connected to the second set containing one or more neutralization cavitation reactor(s). Thus, according to the present invention, the set of the one or more degumming cavitation reactor(s) (1.1) is serially connected to the set of the one or more neutralization reactor(s) (1.2). As a matter of fact, all the other devices included in the present invention are serially connected as well, such as the crude oil tank (1.3) from which the crude oil is pumped through a line (1.4) by a low-pressure pump (1.5). Degumming reactant is introduced into the oil by a dosing device (1.6) (for example a dosing pump). The degumming reactant and oil mixture is then pumped at high pressure by a high-pressure pump (1.7) and introduced into the set of the one or more degumming cavitation reactor (1.1). In the line (1.8) connecting the set of the one or more degumming cavitation reactor(s) (1.1) and the set of the one or more neutralization cavitation reactor(s) (1.2), neutralization reactant is introduced in the oil by a second dosing device (1.9) and the mixture is then introduced into the set of the one or more neutralization cavitation reactor(s) (1.2). Optionally a second high pressure pump (1.10) may be mounted just before the set of the one or more neutralization cavitation reactors (1.2). Then a line (1.11) conducts the processed oil mixture to a phase separation device (1.12), for example a centrifugal separator where the gums, soaps, water, reactants and other impurities (1.13) are separated from the processed oil to yield a degummed and neutralized oil (1.14). Said degummed and neutralized oil is for example stored or directly conducted to other refining process such as bleaching or deodorizing. The mixture of gums, soaps, water, reactants and other impurities are also stored or further processed as well. Optionally, the oil may be heated, for example when leaving the crude oil tank and/or before entering the phase separation device. Optionally, water may be introduced (1.15) before the phase separation. Thus the process according to the present invention in continuous and realized in-line.

Figures 2A, 2B, 2C:
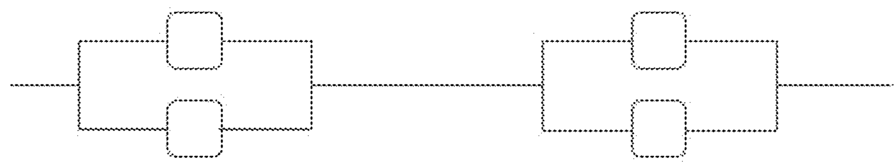
FIG. 2 illustrates various possible connection when several degumming cavitation reactors and/or several neutralization cavitation reactors are used in each set.

However, in the process according to the present invention, when several degumming cavitation reactors or several neutralization cavitation reactors are included in the set, those one can be connected in series or in parallel within a particular set. This is illustrated on FIGS. 2A, 2B and 2C. FIG. 2A illustrates the use of one degumming cavitation reactor connected to two neutralization cavitation reactors disposed in series as single line. FIG. 2B illustrates the use of two degumming cavitation reactors and two neutralization cavitation reactors. The two degumming cavitation reactors as well as the two neutralization reactors are connected in parallel. FIG. 2C illustrates the use of two degumming cavitation reactors connected in series and four neutralization cavitation reactors. The four neutralization rectors are connected as two parallel lines containing each two neutralization cavitation reactors serially connected. Therefore, many arrangements are possible when several degumming cavitation reactors and/or several neutralization cavitation reactors are used. The examples shown on FIGS. 2A, 2B and 2C are only illustrative and not limiting. As a matter of fact, an unlimited number of degumming cavitation reactors as well as an unlimited number of neutralization cavitation reactors can be used and connected either serially, parallelly or combining a serial and parallel connection (as illustrated on FIG. 2C). However, the degumming cavitation reactor(s) and the neutralization cavitation reactor(s) taken as whole, or as a set, are always serially connected. Note that on FIGS. 2A, 2B and 2C the pumps, dosing devices, phase separation devices etc. are not represented in order to simplify the drawings. As a matter of fact the implementation of those items is not affected by the arrangement of the degumming and/or neutralization cavitation reactors within a set.

Thus, the method according to the present invention is based on flow-through, hydrodynamic cavitation reactors able to dramatically accelerate and optimize both the degumming and the neutralization of the oil. Preferred embodiments of the inventive method are represented on FIGS. 3 and 4 where two flow-through, hydrodynamic cavitation reactors are configured in series. The oil that will be processed, for example water degummed soybean oil stored at room temperature in storage tank (3.1) is pumped by low pressure pump (3.2), heated at 60° C. by heat exchanger (3.3) mixed with a degumming reactant (3.4) via adequate dosing device, for example a dosing pump (3.5). Preferably, the degumming reactant comprises water and an acid such as for example phosphoric or citric acid or enzymes such as phospholipase. Directly after the controlled introduction of the degumming reactant into the oil, the obtained mixture is pumped by a high-pressure pump (3.6) at high pressure, preferably in the range of 180 to 1800 psi and forced through a first flow-through, hydrodynamic cavitation reactor (3.7) where the phosphatides become hydrated. A second dosing device (3.8) introduces an aqueous caustic solution into the flow (3.9) of the partially treated oil exiting the first flow-through, hydrodynamic cavitation reactor. The caustic aqueous solution is for example concentrated NaOH which is continuously dosed in the oily fluid that is still at high pressure. High pressure dosing pump (3.8) is therefore needed but since the volume of the caustic aqueous solution that is injected is very small, such HP pump is limited in cost. However, it is important that the dosing is continuous so that an exact quantity of NaOH is delivered into the pre-treated oil. Directly after the controlled introduction of the aqueous caustic solution into the pretreated oil, the obtained mixture is again forced to enter at least a second flow-through, hydrodynamic cavitation reactor(s) (3.10) where the neutralization occurs. The neutralization is the transformation of FFA into soaps. Optionally a second high-pressure pump can be mounted in series between the first cavitation reactor and the other ones. This particular set-up is shown on FIG. 4. The process according to the present invention is ended by a one-step phase separation and thus the cavitation treated oil is sent to a phase separator (3.11) such as for example a centrifugal separator. Thus, degummed and refined oil is obtained and for example stored in tank (3.12). The separated aqueous phase containing the gums, soaps, reactants and eventually other impurities is stored in tank (3.13). Alternatively, the degummed and refined oil can be directly conducted to other refining process such as bleaching or deodorizing. Optionally said cavitation treated oil can be heated by a heat-exchanger (3.14) at for example 90° C. in order to further facilitate the phase separation. Optionally a small buffer tank (3.15) can be included to cope with the eventual output fluctuation of the phase separation device due to maintenance for example. Optionally, a small quantity of water (about 1%) can be added to said cavitation treated oil to facilitate further the phase separation. Usually this adjunction is performed just before the phase separation.

Figure 3:
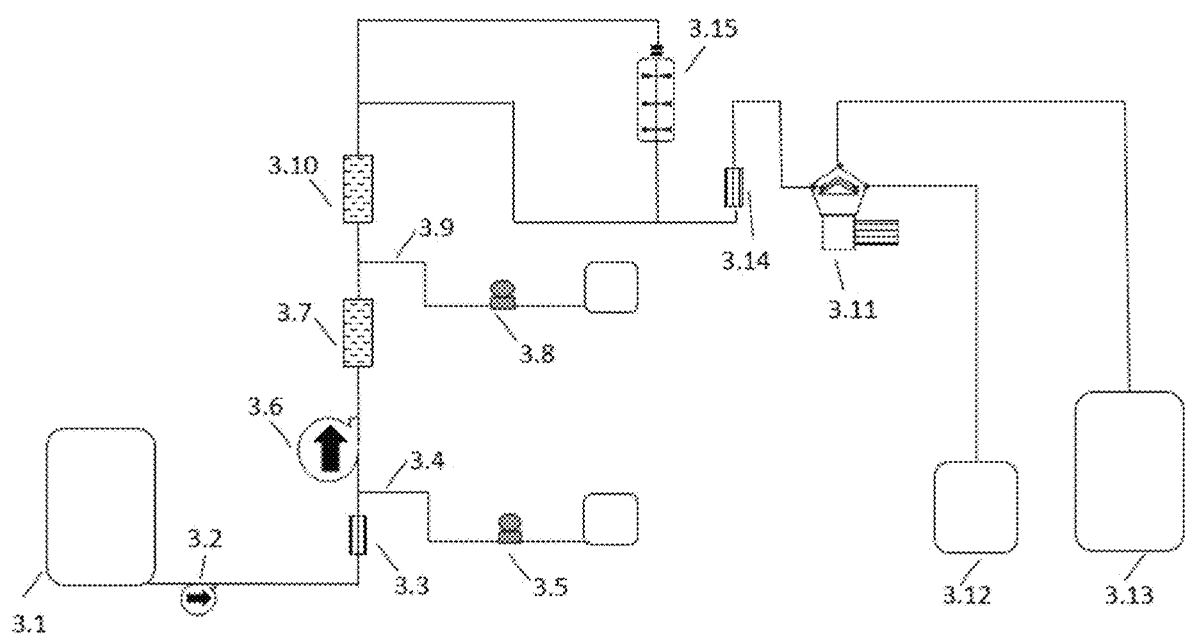
FIG. 3 illustrates a preferred embodiment of the inventive method.
Figure 4:
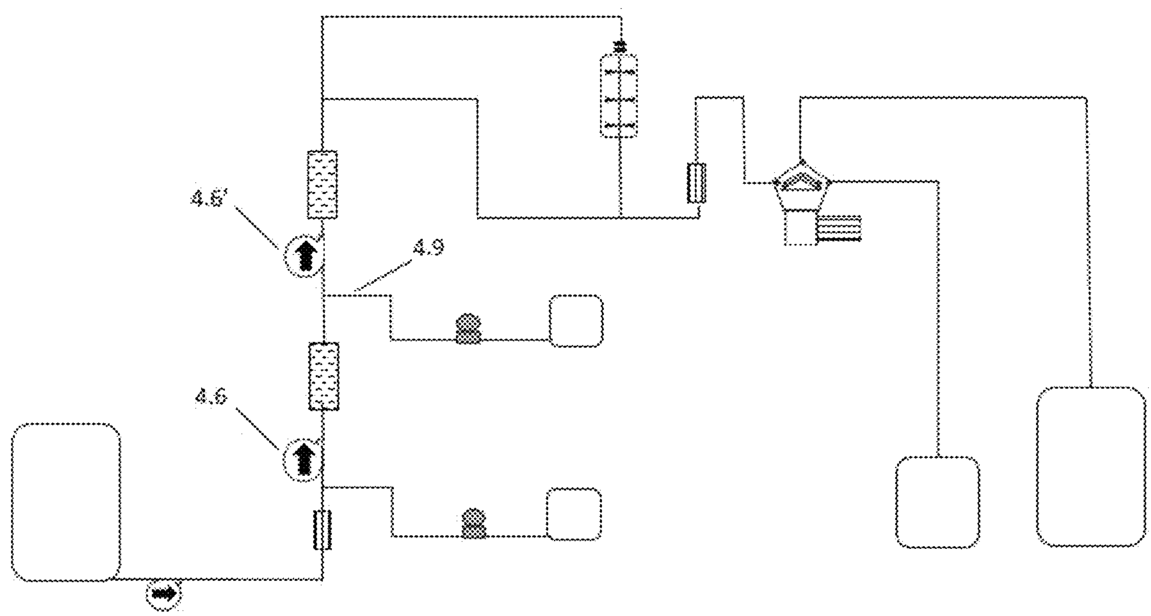
FIG. 4 illustrates another preferred embodiment of the inventive method.

FIG. 4 is similar to FIG. 3 but includes an additional high-pressure pump (4.6') placed just after the adjunction of the caustic neutralizing reactant (4.9). Such embodiment includes thus two high pressure pumps (4.6 and 4.6') and may be preferred to have more control on the pressure of the fluid oily fluid entering the neutralization cavitation reactor(s).

On FIGS. 3 and 4, only one degumming cavitation reactor and only one neutralization cavitation reactor are included, and those reactors are serially connected. Furthermore, the adjunction of adequate reactants is also realized in line. However, as explained before, the present invention also includes the use of several degumming cavitation reactors and/or several neutralization cavitation reactors. In that case either the degumming cavitation reactors or the neutralization cavitation reactors can be connected serially or parallelly within their own set. Nevertheless, regardless of the way the degumming cavitation reactors are connected or the neutralization cavitation reactors are connected the process as described by FIGS. 3 and 4 will remain valid. Hydrodynamic cavitation is the formation of vapor-filled cavities in the fluid flow, which is followed by bubble collapse in a high-pressure zone. In practice, the process is performed as follows: the fluidic flow is pumped into an inlet in the cavitation device. In localized zones of the cavitation device (i.e. the one or more cavitation chambers), the geometry is designed to increase greatly the velocity of the fluid flow causing the fluid pressure to drop according to Bernoulli's law. This leads to the formation of bubbles filled with the vapors of compounds that boil under the given conditions. When the bubbles move past to a high-pressure zone, the pressure in the flow increases such that the bubbles collapse. This exposes the vapors within the bubbles and the adjacent fluid's layers to increased pressure and temperature, strong shearing forces, shock waves, acoustic vibration and electromagnetic irradiation. Such extreme physical conditions result in reactions taking place within the collapsing bubbles or/and in the adjacent fluid layers. It is well known that an increase in both pressure and temperature along with the vigorous mixing provided by cavitation can initiate and accelerate numerous reactions and processes by means of the energy released upon the collapse of cavities (or bubbles) generated in the fluidic media. However, extreme pressure or heat are disadvantageous as they can lead to uncontrolled reactions and/or degradations. Therefore, only the controlled and optimized cavitation treatment combined with the presence of the adequate reactant(s) can be potentially beneficial. Therefore, the present invention preferably make use of specific flow-through hydrodynamic cavitation reactors able to generate controlled cavitation events. Adequate reactors are for example supplied by Cavitation Technologies Inc. (USA) and known in the field as "nanoreactors" in reference to their particularly small sizes.

Cavitation reactors suitable for the process according to the present invention are for example described by U.S. Pat. No. 8,911,808B2. One of the specificity of such designs is that the cavitation temporarily separates the high-boiling oil constituents from the entrapped gases, water vapor and the vapors of the volatile impurities that can be found within the bubbles. The pulsation and/or implosion of these bubbles forcefully mixes the mixture made of oil, water and the reactants, greatly increasing the surface contact area of these unmixable liquids. However, the fluidic mixture loses all cavitational features in a plasmator and/or atomizing cone. It is believed that this particular feature surprisingly allows for efficient subsequent phase separation without the need of a real maturation tank. Efficient phase separation means that the separated oil is sufficiently purified (thus containing only traces of the original contaminants) and that the removed contaminant phase does not contain much entrained oil. However, our invention is not strictly limited by the cavitation described in this previous reference but only by the claims.

It is believed that since hydrodynamic cavitation-assisted degumming provides tremendous mixing and contact surface, it requires substantially smaller amounts of degumming reactant (acid or enzyme for example) and neutralizing reactant (base) than conventional methods. Indeed, the base not only neutralizes the FFA of the oil but also the residual degumming agents which is often an acid. In addition, hydrodynamic cavitation-assisted degumming can be scaled up easily to accommodate large throughputs and this scale up can be realized without footprint penalty.

Aside of the hydrodynamic cavitation reactors described by U.S. Pat. No. 8,911,808B2, other preferred cavitation reactors capable of achieving the objects of the present invention are disclosed in U.S. patent application Ser. Nos. 12/144,539, 12/395,110 and 12/464,646.

Another preferred embodiment of the cavitation reactors suitable for the process according to the present invention includes a multi-stage flow through cavitation reactor described in U.S. application Ser. No. 12/464,646. The cavitation reactor has a flow path having an inlet and an outlet. The flow path has various structures including multi jet nozzles, working chambers, flow guides, hemispherical bodies, turbulizer disks, and a vortex chamber. The structures in the flow path are arranged with mirrored symmetry around a mid-point of the device which is positioned in the vortex chamber. The configuration and operation of the cavitation reactor, including the multi jet nozzles, flow guides, hemispherical bodies, turbulizer disks and vortex generator, is as described in U.S. application Ser. No. 12/464,646.

Another preferred embodiment of the cavitation device suitable for the process according to the present invention includes a multi-stage hydrodynamic cavitation reactor also described in U.S. application Ser. No. 12/464,646. This hydrodynamic cavitation reactor has a flow path having an inlet and an outlet. The flow path has a series of multi jet nozzles disposed therein. Each of the multi jet nozzles include a series of channels disposed across their surfaces, with the size and construction of the channels varying from nozzle to nozzle.

In above described reactors, it must be stressed that in addition to the specific geometry and feature of the internal parts aiming at the creation of the hydrodynamic cavitation, they may optionally contain a plasmator, as described in U.S. application Ser. No. 12/144,539 and/or an atomizing cone as described in U.S. application Ser. No. 12/395,110. It is believed that said plasmator and/or atomizing cone, are playing an important role in the efficiency of the process according to the present invention, in particular for the promotion of the fast and efficient phase separation of the processed oil.

In general, the flow-through cavitation reactors should be fabricated of inert materials. To enhance the resistance to corrosive agents such as strong acids/bases, the inner parts can be coated with ceramics, plastics, Teflon, nano-diamonds and other suitable materials and their composites. The device's properties can be optimized via hardening, anodizing, bonding or any suitable technologies.

The flow-through cavitation reactor internal geometry is preferably static. However, it is possible to control the intensity of the cavitation events by modifying for example the inlet pressure, the inlet temperature and the composition of the fluid medium. For example, certain oils, fluidic fats or tallows may require to work at high temperature in order to reduce their viscosity.

The flow-through cavitation reactors can be placed at an oil pressing site, nearby a storage container or attached to such a structure. Yet another possibility exists, in which the device is not fixed but movable. The cavitation device is designed to degum and neutralize large volumes of oil. Additional lines and skid systems can be assembled to retrofit older facilities and scale up their capacity. These systems can be easily mounted and transported, making them equally suitable for fields and remote locations than they are for large centralized facilities.

Retention time of the processed oil in the at least two hydrodynamic cavitation reactors is particularly reduced compared to prior art methods. Typical retention time in an individual cavitation reaction will be typically less than 30 seconds, preferably less than 10 seconds. Specific retention time in the decavitation chamber is typically less than 10 seconds, preferably less than 3 seconds.

It is an equipment cost decision the type of flow-through hydrodynamic cavitation reactor and which type of pumps to employ since a number of configurations are technically feasible within the scope of the invention, whether for large scale permanently used or for small and occasionally used degumming and neutralization installations. One can ensure optimal conditions by creating intense cavitation evenly throughout the oil flow while avoiding wasting energy. Ideally, the energy applied should be lowered to an optimized level where cavitation still effectively occurs, and energy expenditure is minimal. One alternative configuration according to the present invention is depicted on FIG. 4. Two high-pressure pumps are used. The nominal pressure delivered by each of those two high-pressure pumps is then lower than the nominal pressure of the single high-pressure pump that must force the oil and adequate reactants to go through the at least two cavitation reactors in series as depicted on FIG. 4. Using two high pressure pumps, as depicted on FIG. 3, allows to facilitate the fine tuning of the inlet pressure of each of the cavitation reactors. Furthermore, it must be stressed that in some circumstances the cost of two small high-pressure pumps can be equivalent or even lower than the cost of one larger high-pressure pump when the nominal pressures that have to be delivered by the two-small high-pressure pump is lower than the nominal pressures delivered by the large high-pressure pump.

Thus, a method for the combined degumming and neutralization of oils through the creation of cavitation events is disclosed. Crude or partially refined oils contain contaminants such as phosphatides, free fatty acids, and other impurities. These contaminants need to be removed prior to subsequent processing's. In addition, some of those contaminants are useable in other processes depending upon their purity and composition.

The terms oil, oils or oily include, but are not limited to fatty materials or mixtures thereof originating from plants, from animals or from wild type or genetically modified bacteria, yeast, algae and other prokaryotes and eukaryotes. The terms oil, oils or oily also encompass two-phase or multi-phase system comprising of oil, water and/or other immiscible liquids, solutions of salts, acids, alkali, gases and/or other solutes, dispersions, emulsions, suspensions, melted solids, gases in a supercritical state and mixtures thereof. The oil may be heated, cooled, degassed, or saturated with nitrogen, carbon dioxide, and other gasses or mixtures thereof.

Cavitation-assisted degumming does not require much preheating of crude vegetable oil or water and, therefore, can be conducted at temperatures from 20 to 90° C. Temperature as low as 20° C. can be advantageous in some circumstances to protect unsaturated fatty acids from oxidation and deterioration and furthermore conserves energy. Temperature as high as 90° C. can be advantageous in other circumstances, for example to treat particularly viscous oils or fats. However, it has been observed that in many cases the oil is advantageously heated at about 60° C. At this temperature viscosity of most common oils is already substantially low, and less energy is required to processes the oil through the cavitation reactors. Furthermore, most common oils are stable at such moderate temperatures.

In another preferred embodiment, the crude or partially refined oil is combined with either water or a water solution of reactant to form a fluid medium comprising an oil phase and a water phase. The water phase may comprise soft, distilled or reverse osmosis-purified water. The water solution of reactant preferably comprises suitable degumming agents, i.e., phosphoric acid and/or citric acid, or other similar reagents. However, any of the prior art degumming reactant can potentially be employed in the inventive method including for example enzymes and chelating agents. The fluid medium is then subjected to cavitation-assisted processing. After the cavitation-assisted degumming, the fluid medium still at substantial pressure is mixed with a caustic aqueous solution and is conducted to at least a second cavitation reactor where FFA are neutralized into soaps which move rapidly to the distinct water phase.

The treated oil phase can then be separated from the water phase directly at the exit of the last cavitation reactor to yield a degummed and neutralized oil containing greatly reduced amounts of phospholipids and FFA. Residual level of phospholipids in the treated oil is preferably below 10 ppm, even more preferably below 5 ppm. Level of FFA in the treated oil is preferably below 0.1%, even preferably below 0.05%. Those levels are based on the weight ratio of the phospholipids and FFA in the oil. As previously discussed above, even if the present invention allows an efficient phase separation to occur directly at the exit of the last cavitation reactor, it is nevertheless advantageous to install a small buffer tank between said last cavitation reactor and the device performing the phase separation (for example a centrifugal separator). Indeed, most phase separator device need regular maintenance and cleaning operation known in the field as "desludging". However, such maintenance is usually performed very rapidly and hence a small buffer tank corresponding to a few minutes of operation is sufficient. Thus, such buffer tank cannot have the function of a maturation tank because its volume is too small.

The cavitation-assisted processing is accomplished through the use of a single or multi-stage, flow-through hydrodynamic cavitation device to create cavitation events in the fluid flow. Those cavitation event first generate a large number of bubbles within the processed fluid. The subsequent collapse of those cavitation bubbles results in localized regions of increased pressure, increased temperature and tremendous mixing to degum and neutralize the oil. The subsequent cancelation of any cavitation, preferably in the vicinity of the outlet of the last cavitation reactor drive at least partially the products of the degumming (gums) and the products of the neutralization (soaps) into the water phase. Preferably, the cavitation events occur in several cavitation chambers and the cancellation of any cavitation events and the suppression of any second-generation bubbles occurs in one or more plasmator and/or one or more atomizing cone collectively named decavitation chamber.

During the cavitation-assisted processing which occur in the cavitation chambers of the two or more cavitation reactors and in presence of adequate aqueous solution of reactants, the phosphatides are hydrated and transformed in gums and the FFA are neutralized and transformed into soaps and during the decavitation both move and agglomerate at least partially in a distinct water phase. In order to isolate the refined oil and collect the potentially valuable by-products, the cavitation-assisted processing must be followed by a downstream efficient phase separation procedure. In the downstream separator, the hydrated phosphatides (or gums) and soaps are removed and sent to storage or for alternate processing. Such separation procedures is preferably centrifugation but alternative methods may include settling and filtration by membrane or ultra-membrane for example. The isolated aqueous mixture of gums and soaps can be used as an animal feed additive or further processed with known processes such as gums deoiling and/or soaps splitting.

Such separation is preferably accomplished in a centrifuge at the same temperatures as the cavitation steps or after moderate heating, for example to 90° C. It has been observed that phase separation can be improved at 90° C. because the viscosity of the oil is further decreased. It has been observed that even with 0.5-5% by volume of water added during the combined degumming and neutralization process, the moisture content of the degummed and neutralized oil, after the centrifuge separation drops to 0.2 to 0.4% by mass. Thus, less drying is required and the oil can be even subjected directly to downstream refining such as bleaching and/or deodorizing.

The implosion or collapse of the bubbles created by the initial cavitation occurrences results in the formation of a second generation of micro bubbles. When these micro bubbles move into a reduced pressure zone, they become nuclei, enhancing the cavitation field density and lowering the cavitation threshold. Such enhancement facilitates phosphatides hydradation and FFA neutralization when oil is in contact with adequate reactants. This makes multi-stage flow-through cavitation reactors especially suitable for degumming and neutralizing oils since the cavitation threshold is constantly lowered from the first to the last cavitation chambers. However, as pointed out in WO 2016/178676A1, those micro bubbles and nuclei can complicate phase separation. Therefore, means to cancel the formation of micro bubbles preferably equip at least one of the cavitation reactor and more preferably the last cavitation reactor used in the process according to the present invention. Even more preferably, those means to cancel the formation of micro bubbles is fitted after the last cavitation chamber of the last cavitation reactor used in the process according to the present invention. In a preferred embodiment, the last cavitation chamber of the last cavitation reactor is followed by at least one decavitation chamber comprising at least one plasmator and/or an atomizing cone. Such decavitation chamber is surprisingly highly effective since fast and efficient phase separation of the treated oil mixture is achievable even if the retention time of the oil mixture into such decavitation chamber is particularly short, typically less than 10 seconds, preferably less than 3 seconds.

The cavitation phenomenon is categorized by the cavitation number Cv, defined as:

$$Cv=(P-Pv)/(0.5\ \rho V^2),$$

where P is the fluid mixture pressure downstream of the constriction, Pv is the vapor pressure of water, V is fluid's mixture velocity at the constriction, and ρ is the density of the oil. Cavitation starts ideally at the cavitation inception number Cvi=1, and the Cv<1 implies a high degree of cavitation. In the process according to our invention, the cavitation inception number Cv is lower than 1 in at least one of the cavitation chambers, preferably the first one, included in the at least two cavitation reactors used for the process according to the present invention.

The intensity of cavitation events (i.e., the size and the number of the bubbles per unit of volume of the processed liquid), is an important parameter for the efficiency of the process according to the present invention. The intensity of the cavitation events depends on the properties of the fluid flow, the design of the cavitational device, the flow velocity sustained by the high-pressure pump(s), the temperature of the fluid flow, and other treatment conditions. In practice, the pump(s) pressure is/are increased until a proper cavitation intensity is achieved. The desirable outcome is obtained by generating hydrodynamic cavitation having an optimal intensity consistently throughout the fluid flow. The preferred embodiment of the present invention optimizes the cavitation intensity to efficiently degum and neutralize oil by applying the most suitable pump(s) pressure, selected from a range of for example 180 to 1,800 psi. Further, the efficiency of cavitation-assisted degumming and neutralization is high for a wide range of temperatures, allowing for better preservation of unstable valuable ingredients at low temperatures when needed. A practical approach to optimize the process is to establish an adequate inlet pressure that provides enough cavitation intensity for thorough mixing of the sequentially added degumming reactant and caustic aqueous solutions to the flow of oil, that yield to the complete hydration of the phosphatides and the complete neutralization of the FFA.

The amount of water that is added to the oil to be degummed and neutralized is preferably within the range of 0.5-5.0% by volume. For example, 25% of this amount may be added when the acid solution is injected and 75% of this amount may be injected when the caustic solution is added. However, important variation of this proportion may occur depending on the relative concentration of the phosphatides and the FFA in the processed oil. In general, the higher the amount of phosphatides to be removed or the higher the amount of FFA to be removed, the higher the amount of respectively the acid aqueous solution or the caustic aqueous solution to be added to the treated oil.

However, one skilled in the art understands that different oils require different conditions in order for an efficient degumming and/or neutralization to occur. Therefore, the 180 to 1,800 psi pump(s) pressure and the amount of 0.5-5.0% by volume of added water are not intended to limit the scope of the present invention. The cavitation-assisted sequential degumming and neutralization as described in the present invention can occur in any conditions, as needed, to achieve proper cavitation intensity leading to the desired results.

Consequently, the following example is given for illustrating the present invention and should not be considered as a limitation on either the scope or spirit of the invention. This example illustrates how water-degummed soybean oil can be deeply degummed and neutralized with the process according to the present invention.

Example

In this example, the treated oil is a water-degummed soybean oil still containing the substantial amount of 140 ppm of phosphorous since water degumming removes most of the hydratable phosphatides but is less able to remove the NHP. FFA concentration is 1.2%. Those values are rather typical for soybean oil directly water-degummed after extraction. The water degummed (WDG) soybean oil stored at room temperature (about 20° C.) is conducted to a heat-exchanger to raise its temperature to 60° C. Then, a dosing pump injects an aqueous solution of Phosphorous Acid (2M) in the stream of warm oil. The volume of this acid aqueous solution represents only 0.05% of the processed oil volume. In industrial practice the relative volume of this acid aqueous solution is simply calculated and maintained constant with proper pumps output. In this example, the output of the feeding low pressure oil pump is 5 T per hour and the output of dosing pump is 2.5 kg per hour. In order to minimize the consumption of chemicals, and guarantee an efficient degumming, it is important to maintain a steady concentration of the acid aqueous solution in the oil and therefore efficient dosing pump selection is critical. Indeed, if too much acid solution is temporally supplied, at least a part of it will be wasted. On the contrary, if an insufficient amount of acid solution is temporally supplied, a complete degumming will not take place. Good results were observed with heavy-duty multi-pistons pumps which avoid the pulsation phenomenon of the supplied acid aqueous solution.

The oil/aqueous acid mixture is then conducted to a high-pressure pump in order to compress the mixture to 885 psi. Such high pressure of 885 psi is necessary to force the mixture to go through the flow-through hydrodynamic cavitation reactor, and to initiate cavitation. Indeed, cavitation will occur when cavitation number is lower than 1 and therefore the pressure P must be sufficiently high. Good results were obtained with multistage centrifugal high-pressure pumps. However, it is expected that most high-pressure pump are susceptible to perform efficiently provided that the output is constant. Even if high pressure pump(s) is/are essential for the creation of the adequate cavitation intensity, many known manufactures propose high pressure pump susceptible to perform correctly. The oil/aqueous acid mixture flows through a first hydrodynamic cavitation reactor where the reaction with the acid takes place i.e. the phosphatides becomes very rapidly hydrated in presence of said acid aqueous solution in combination with the cavitation occurring in this first cavitation reactor. Mixing is so strong that the temperature of the mixture is increased by about 5° C. At the exit of the first reactor, a second dosing pump injects a caustic aqueous solution of sodium hydroxide (3M/liter) in the flow of oil. The volume of the caustic aqueous solution represents 1.5% of the volume of the processed oil. Therefore, the output of this second dosing pump was of 75 kg/hr. The second dosing pump is also a heavy-duty multi-pistons pump which avoid the pulsation phenomenon of the supplied fluid. The oil mixture enters the second cavitation reactor at a pressure of 635 psi (measured with pressure gauge) and the neutralization of the FFA into soaps will take place rapidly in presence of sodium hydroxide in combination with the hydrodynamic cavitation taking place in this second cavitation reactor. The two flow-through cavitation reactors in series are of the multistage type and are made of an assembly of 7 cavitation chambers. The second flow-through cavitation reactor is equipped with an additional decavitation chamber placed directly after the last cavitation chamber. The two flow-through cavitation reactors are supplied by Cavitation Technologies Inc. (USA) under the trade name of Nanoreactor™ and rated for a typical flow of about 5 tons per hour. At the exit of the second cavitation reactor, 1% of additional water was introduced in the treated oil which was then centrifuged using a centrifugal separator (GEA, Germany) typically used in the oil degumming and/or oil neutralization. Degummed and neutralized oil was obtained having a phosphorous concentration of 4.8 ppm, a residual FFA concentration of 0.05%, residual soaps concentration of 0.02% and a water concentration of 0.3%. The separated aqueous phase contained the removed gums, soaps, phosphate sodium salts and minimal amount of entrained oil (0.3%). Such oil entrainment is not a downside of the process according to the present invention but is linked to the emulsification properties of phospholipids and soaps. Such oil entrainment would happen in any degumming and/or neutralization process but in the process according to our invention the oil entrainment is minimized to for example 0.3% (on weight/weight ratio) of the treated oil.

Therefore, as illustrated in the previous example, the present invention creates beneficial conditions that cannot be duplicated by the prior art, in particular the fast and complete degumming and neutralization directly followed by the efficient phase separation yielding to oil having particularly low concentration of residual phosphatides, FFA, soaps and water.

Significant economic benefits are experienced through the use of the present invention. The optimized usage of a flow-through hydrodynamic cavitation reactors serves to lower equipment, handling, erection and energy costs, reduce the chemicals consumption and oil loss and it improves the efficiency of the degumming, the neutralization and the phase separation. Furthermore, combined cavitation-assisted degumming and neutralization presents fewer environmental problems since effluent are minimized. Footprint of the installation is also dramatically reduced. The combination of technological simplicity and economic feasibility makes the cavitation-assisted degumming and neutralization attractive for both small and large oil production. It is highly advantageous that the cavitation assisted combined degumming and neutralization is ended by a single separator, most of the time a centrifugal separator. Hence, loss of entrained oil may be reduced compared to alternative process of the prior art requiring an individual phase separator after the degumming step and at least a second one after the neutralization. As a matter of fact, most neutralization processes require two centrifuge separations, a first one just after the neutralization per se, removing most of the soaps and gums, and a second centrifugal separation to remove the last trace of soaps and gums. Therefore, the process according to our invention replace two centrifugal separation steps by one single centrifugal separation step. Without willing to be bound to theory, it is believed that the caustic neutralization of the oil can be undertaken directly after the acid degumming, without intermediate phase separation to remove the gums and the residual acid, because the hydrodynamic cavitation assisted degumming can efficiently take place with considerably reduced amount of acid, typically 50% or less than the quantity necessary in conventional degumming processes not assisted by the hydrodynamic cavitation.

The beneficial effects gained through the present invention cannot be achieved through prior art method, using conventional mixer, sonic or ultrasonic cavitation, rotor-stator cavitation, homogenizers, or other prior art cavitation methods because the conditions created by the at least two flow-through cavitation reactors as described herein cannot be duplicated by other means. In sound-induced cavitation, the bubbles form a barrier to further transmission and attenuate the sound waves, limiting the effective range of the induced sound waves. Furthermore, the ultrasonic irradiation modifies media at the specific locations, depending on the frequency and source power. Rotor-stator induced cavitation is unable to generate a dense and controlled cavitation field. Homogonizer are designed to generate an intense homogeneous mixing but below the cavitation threshold, hence the reactions speed leading to the degumming and the neutralization stay below the ones observed in the present invention.

The preferred embodiments of the present invention are disclosed herein. However, it should be understood that the disclosed embodiments are merely exemplary of the invention, which may be embodied in various forms. Therefore, the details disclosed herein are not to be interpreted as limiting, but merely as informative of the invention and as a basis for teaching one skilled in the art how to make and how to use the present invention.

Although several embodiments have been described in detail for purposes of illustration, various modifications may be made without departing from the scope and spirit of the invention. Accordingly, the invention is not to be limited, except as by the appended claims.

The invention claimed is:

1. A continuous process for the combined degumming and neutralization of oil containing phosphatides and free fatty acids (FFA), said process comprising the following steps:

a) dosing an aqueous degumming reactant into an oil containing phosphatides and FFA to form a mixture of aqueous degumming reactant dispersed into said oil containing phosphatides and FFA, b) introducing said mixture of aqueous degumming reactant dispersed in oil containing phosphatides and FFA into a first set of flow-through hydrodynamic cavitation reactors, to form at the exit of said first set of flow-through hydrodynamic cavitation reactors a mixture of oil containing hydrated phosphatides and FFA, c) dosing, at the exit of said first set of flow-through hydrodynamic cavitation reactors an aqueous caustic solution into said oil containing hydrated phosphatides and FFA to form a mixture of aqueous caustic dispersed into said oil containing hydrated phosphatides and FFA, d) introducing said mixture of an aqueous caustic dispersed into said oil containing hydrated phosphatides and FFA into a second set of flow-through hydrodynamic cavitation reactors, to form at the exit of said second set of flow-through hydrodynamic cavitation reactors a mixture of oil containing hydrated phosphatides and neutralized FFA (soaps), e) separating the mixture of oil containing hydrated phosphatides and soaps to obtain an oil phase and an aqueous phase, wherein said aqueous phase comprises a degummed and neutralized oil and hydrated phosphatides (gums) and neutralized FFA (soaps) dispersed and/or solubilized in water, characterized in that each flow-through hydrodynamic cavitation reactors of the first set and of the second set comprises at least one cavitation chamber having a cavitation number Cv lower than 1.

2. The continuous process for the combined degumming and neutralization of oil containing phosphatides and FFA according to claim 1, wherein said oil containing phosphatides and FFA is forced through the first and second sets of flow-through hydrodynamic cavitation reactors by the action of one high pressure pump positioned before the first set of flow-through hydrodynamic cavitation reactors.

3. The continuous process for the combined degumming and neutralization of oil containing phosphatides and FFA according to claim 1, wherein said oil containing phospholipids and FFA is forced through the first and second set of flow-through hydrodynamic cavitation reactors by the action of two high pressure pumps, the first one being positioned before said first set flow-through hydrodynamic cavitation reactors and the second high pressure pump being placed between the first and second set of flow-through hydrodynamic cavitation reactors.

4. The continuous process for the sequential degumming and neutralization of oil containing phosphatides and FFA according to claim 1, wherein said phase separation step e) is performed by a centrifugal separator.

5. The continuous process for the combined degumming and neutralization of oil containing phosphatides and FFA according to claim 4, wherein 0.5 to 2.0% of water is added to the degummed and neutralized oil prior to be treated by a centrifugal separator.

6. The continuous process for the combined degumming and neutralization of oil containing phosphatides and FFA according to claim 4, wherein the degummed and neutralized oil is heated at a temperature comprised between 70 and 95° C.

7. The continuous process for the combined acid degumming and neutralization of oil containing phosphatides and FFA according to claim 1, wherein the degumming agent is an aqueous solution of citric acid or phosphoric acid.

8. The continuous process for the combined degumming and neutralization of oil containing phosphatides and FFA according to claim 1, wherein the degumming agent is enzyme comprising lipase, phospholipase, acyltransferase or a blend thereof.

9. The continuous process for the combined acid degumming and neutralization of oil containing phosphatides and FFA according to claim 1, wherein the aqueous caustic solution of an aqueous solution of sodium hydroxide or potassium hydroxide.

10. The continuous process for the combined degumming and neutralization of oil containing phosphatides and FFA according to claim 1, wherein said aqueous degumming reactant of step a) and/or said aqueous caustic of step d) is introduced by a high-pressure dosing device.

11. The continuous process for the combined degumming and neutralization of oil containing phosphatides and FFA according to claim 1, wherein the oil containing phosphatides and FFA is further heated in the range of 20 to 70° C. prior to step a).

12. The continuous process for the combined degumming and neutralization of oil containing phosphatides and FFA according to claim 1, wherein the first and/or the second set of flow-through hydrodynamic cavitation reactors contain at least one flow-through hydrodynamic cavitation reactors.

13. The continuous process for the combined degumming and neutralization of oil containing phosphatides and FFA according to claim 1, wherein the first and/or the second set of flow-through hydrodynamic cavitation reactors contain at least two flow-through hydrodynamic cavitation reactors.

14. The continuous process for the combined degumming and neutralization of oil containing phosphatides and FFA according to claim 1, wherein the first and/or the second set of flow-through hydrodynamic cavitation reactors contain at least two flow-through hydrodynamic cavitation reactors and said at least two flow-through hydrodynamic cavitation reactors are serially or parallelly connected.

* * * * *